(12) United States Patent
Zeng

(10) Patent No.: US 10,282,627 B2
(45) Date of Patent: May 7, 2019

(54) METHOD AND APPARATUS FOR PROCESSING HANDWRITING DATA

(71) Applicant: ALIBABA GROUP HOLDING LIMITED, George Town, Grand Cayman (KY)

(72) Inventor: Yuewei Zeng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/000,123

(22) Filed: Jan. 19, 2016

(65) Prior Publication Data

US 2016/0210499 A1    Jul. 21, 2016

(30) Foreign Application Priority Data

Jan. 19, 2015    (CN) .......................... 2015 1 0025759

(51) Int. Cl.
*G06K 9/00* (2006.01)

(52) U.S. Cl.
CPC ..... *G06K 9/00979* (2013.01); *G06K 9/00194* (2013.01)

(58) Field of Classification Search
None
See application file for complete search history.

(56) References Cited

U.S. PATENT DOCUMENTS

| 4,286,255 | A | * | 8/1981 | Siy | ....................... | G07C 9/0015 382/123 |
| 6,600,834 | B1 | | 7/2003 | Su et al. | | |
| 7,215,815 | B2 | | 5/2007 | Honda | | |
| 9,182,908 | B2 | | 11/2015 | Sugiura | | |
| 9,235,748 | B2 | | 1/2016 | Mettyear | | |
| 2005/0152600 | A1 | | 7/2005 | Chen et al. | | |

(Continued)

FOREIGN PATENT DOCUMENTS

| CN | 101183284 A | 5/2008 |
| CN | 102959896 A | 3/2013 |

(Continued)

OTHER PUBLICATIONS

Rioja, F. Ramirez, et al. "Dynamic features extraction for on-line signature verification." Electronics, Communications and Computers, 2004. CONIELECOMP 2004. 14th International Conference on. IEEE, 2004.*

(Continued)

*Primary Examiner* — Bhavesh M Mehta
*Assistant Examiner* — Tracy Mangialaschi
(74) *Attorney, Agent, or Firm* — Finnegan, Henderson, Farabow, Garrett & Dunner, LLP

(57) ABSTRACT

A method for processing handwriting data is provided. The method includes filtering the handwriting data to remove one or more ineffective data points, acquiring a number of sampling points included in the handwriting data, when the number of the sampling points exceeds a first threshold, screening the handwriting data such that the number of the sampling points included in the screened handwriting data is not greater than the first threshold, acquiring attribute information of the handwriting data and processing the attribute information based on a preset length, and transmitting the screened handwriting data through a network.

17 Claims, 6 Drawing Sheets

(56) References Cited

U.S. PATENT DOCUMENTS

| | | | |
|---|---|---|---|
| 2006/0050962 A1* | 3/2006 | Geiger | G06K 9/222 382/186 |
| 2006/0072825 A1 | 4/2006 | Hullender et al. | |
| 2008/0227075 A1 | 9/2008 | Poor et al. | |
| 2010/0254578 A1 | 10/2010 | Modir Shanechi et al. | |
| 2014/0075302 A1 | 3/2014 | Akashi | |
| 2014/0105503 A1 | 4/2014 | Motoi | |
| 2014/0119659 A1 | 5/2014 | Sugiura | |
| 2014/0222968 A1* | 8/2014 | Rakan | G06F 3/03545 709/219 |
| 2015/0131874 A1* | 5/2015 | Mettyear | G06K 9/00865 382/122 |
| 2016/0132232 A1 | 5/2016 | Baba et al. | |

FOREIGN PATENT DOCUMENTS

| | | |
|---|---|---|
| CN | 103268166 A | 8/2013 |
| WO | WO2014169835 A1 | 10/2014 |
| WO | WO2015032305 A1 | 3/2015 |

OTHER PUBLICATIONS

Wang, Daqing, Bilan Zhu, and Masaki Nakagawa. "A Digital Ink Recogntion Server for Handwritten Japanese Text." Document Analysis and Recognition (ICDAR), 2011 International Conference on. IEEE, 2011.*

Huang, Bing Quan, Y. B. Zhang, and M-T. Kechadi. "Preprocessing techniques for online handwriting recognition." Intelligent text categorization and clustering. Springer, Berlin, Heidelberg, 2009. 25-45.*

Mohankrishnan, N., Wan-Suck Lee, and Mark J. Paulik. "A performance evaluation of a new signature verification algorithm using realistic forgeries." Image Processing, 1999. ICIP 99. Proceedings. 1999 International Conference on. vol. 1. IEEE, 1999.*

PCT International Search Report and Written Opinion dated Mar. 31, 2016, issued in corresponding International Application No. PCT/US2016/13822 (8 pages).

First Chinese Search issued by the State Intellectual Property Office of China in Chinese Application No. 201510025759.X dated Apr. 24, 2018, 1 page.

First Chinese Office Action issued by the State Intellectual Property Office of China in Chinese Application No. 201510025759.X dated May 3, 2018, 11 pages.

SIPO Second Chinese Office Action issued in corresponding Chinese Application No. 201510122749.8 dated Mar. 5, 2019, 14 pages.

* cited by examiner

METHOD AND APPARATUS FOR PROCESSING HANDWRITING DATA

CROSS-REFERENCE TO RELATED APPLICATION

This application is based upon and claims priority to Chinese Patent Application No. 201510025759.X, filed Jan. 19, 2015, the entire contents of which are incorporated herein by reference.

TECHNICAL FIELD

The present application relates to the technical field of data processing and, more particularly, to a method and an apparatus for processing handwriting data.

BACKGROUND

In the field of identity recognition and security authentication, biometric features are often used for identity recognition and security authentication. Handwriting recognition is a type of biometric feature recognition that determines whether two parts of handwriting data belong to handwriting of the same person by comparatively identifying the two parts of handwriting data using a computer mode recognition method. Since handwriting recognition has the advantage of relatively high level of security, it has been widely applied.

Conventionally, after a client terminal acquires handwriting data of a user, the acquired handwriting data is transmitted to a server through a network such that the server may perform corresponding processing. Due to the large volume of the handwriting data transmitted from the client terminal to the server, performing the handwriting recognition may take a great amount of network resources and consume substantial power of the user equipment in which the client terminal resides, thereby resulting in a degraded user experience.

SUMMARY

The present disclosure provides a method for processing handwriting data. Consistent with some embodiments, the method includes filtering the handwriting data to remove one or more ineffective data points, acquiring a number of sampling points included in the handwriting data, when the number of the sampling points exceeds a first threshold, screening the handwriting data such that the number of the sampling points included in the screened handwriting data is not greater than the first threshold, acquiring attribute information of the handwriting data and processing the attribute information based on a preset length, and transmitting the screened handwriting data through a network.

Consistent with some embodiments, this disclosure provides an apparatus for processing handwriting data. The apparatus includes a preprocessing unit configured to preprocess the handwriting data. The preprocessing unit includes a filtering subunit, a screening subunit and an attribute information processing subunit. The filtering subunit may be configured to filter the handwriting data to remove one or more ineffective data points. The screening subunit may be configured to acquire a number of sampling points included in the handwriting data, and when the number of the sampling points exceeds a first threshold, screen the handwriting data such that the number of the sampling points included in the screened handwriting data is not greater than the first threshold. The attribute information processing subunit may be configured to acquire attribute information of the handwriting data and process the attribute information based on a preset length. The apparatus may further include a transmission unit configured to transmit the preprocessed handwriting data through a network.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Consistent with some embodiments of this disclosure, a method and an apparatus for processing handwriting data are provided. The method for processing handwriting data may be applied to a client terminal, where the client terminal is in data connection with a server through a network. The client terminal may be implemented in electronic equipment, such as desktop computers, laptop computers, mobile terminals (e.g., smart phones, non-smart mobile phones, tablet computers), and so on.

Figure 1:
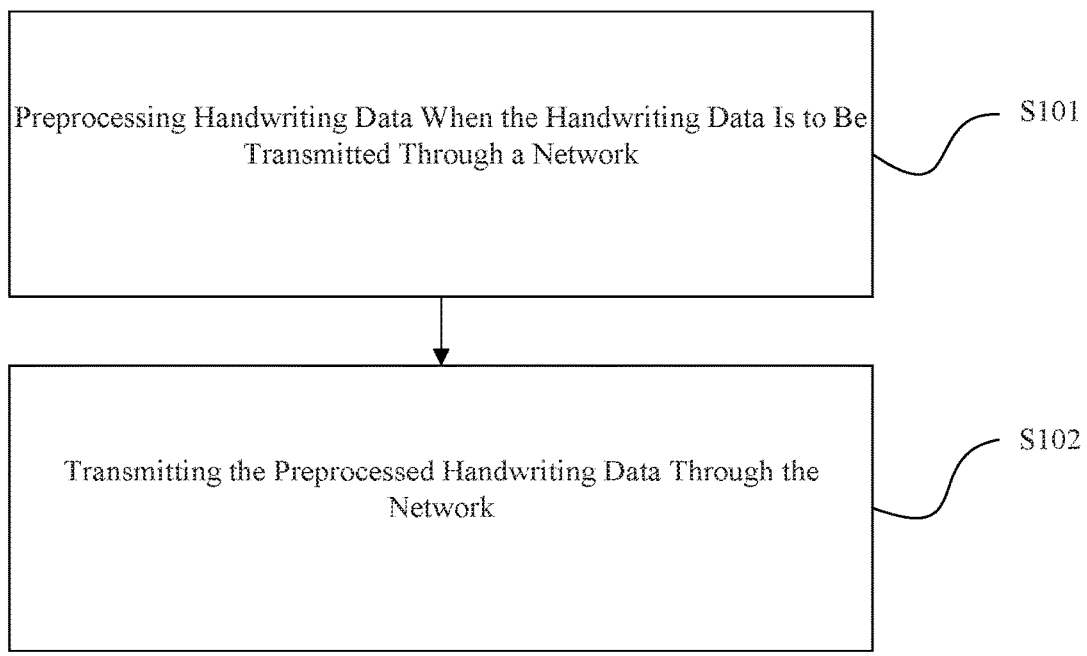
FIG. 1 is a flowchart of an exemplary method for processing handwriting data, consistent with some embodiments of this disclosure.

FIG. 1 is a flowchart of an exemplary method 100 for processing handwriting data, consistent with some embodiments of this disclosure. The exemplary method 100 may be performed by a client terminal. Referring to FIG. 1, the method 100 includes the following steps.

In step S101, the client terminal preprocesses handwriting data when the handwriting data is to be transmitted through a network. For example, in a scenario that a client terminal acquires handwriting data and uploads the acquired handwriting data to a server, the client terminal may acquire handwriting data and perform the preprocessing of handwriting data offline. The preprocessed handwriting data may be transmitted to a server when the client terminal is in data connection with the server through a network. As another example, in a scenario that the client terminal transmits the handwriting data through the network in response to a data request transmitted by the server, the client terminal may perform preprocessing to the handwriting data after receiving the data request transmitted by the server, so as to reduce the volume of data to be transmitted and the occupied network bandwidth. Various triggering conditions may be set to trigger the preprocessing of handwriting data, such as timed triggering, triggering under the request of the server, triggering while detecting connection with the network, which are not intended to be limited by the present disclosure.

Figure 2:
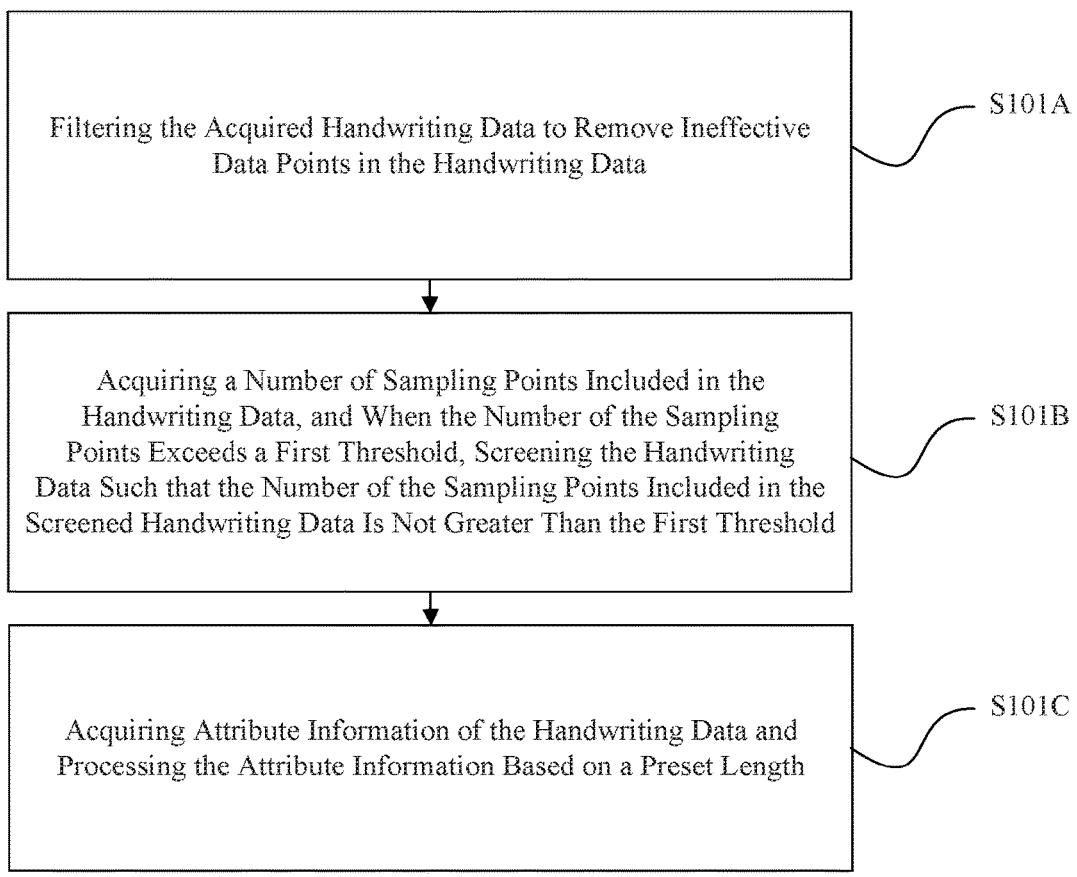
FIG. 2 is a flowchart of an exemplary method for preprocessing handwriting data, consistent with some embodiments of this disclosure.

FIG. 2 is a flowchart of an exemplary method 200 for preprocessing handwriting data, consistent with some embodiments of this disclosure. The exemplary method 200 may be performed by a client terminal. Referring to FIG. 2, the method 200 includes the following steps.

In step S101A, the client terminal filters the acquired handwriting data to remove ineffective data points in the handwriting data.

In some embodiments, step S101A may include acquiring handwriting length of various sampling points of the handwriting data. When the handwriting length of the sampling point is greater than a second threshold or less than a third threshold, the client terminal may determine the sampling point as an ineffective point and remove the ineffective point from the handwriting data. The values of the second threshold and the third threshold may be preset by a handwriting recognition system.

To remove the redundant and ineffective data, the acquired handwriting data may be filtered in advance. For example, a misoperation of a user may cause the acquired handwriting data length to be too short, and some malicious operations of a user such as randomly scrawling may cause the handwriting data length to be too long. Therefore, by acquiring the handwriting length of each sampling point forming the handwriting data and determining whether the handwriting length of the sampling point is greater than the second threshold or less than the third threshold, the ineffective sampling point may be removed from the handwriting data.

In step S101B, the client terminal acquires the number of sampling points included in the handwriting data, and when the number of the sampling points exceeds a first threshold, the client terminal screens the handwriting data such that the number of the sampling points included in the screened handwriting data is not greater than the first threshold.

In order to reduce the data volume, the handwriting data may be screened and the number of the sampling points included in the handwriting data may be controlled to reduce the data volume. For example, when it is determined that the number of the sampling points included in the handwriting data is greater than the preset threshold, the handwriting data may be screened.

In some embodiments, screening the handwriting data may include the following steps. First, the client terminal may acquire a ratio of the number of the sampling points included in the handwriting data to the first threshold. Second, by taking the first sampling point as a current sampling point and using the ratio as a sampling interval, the client terminal may select sampling points closest to the current sampling point to perform handwriting resampling until the number of the acquired sampling points is equal to the first threshold.

Figure 3:
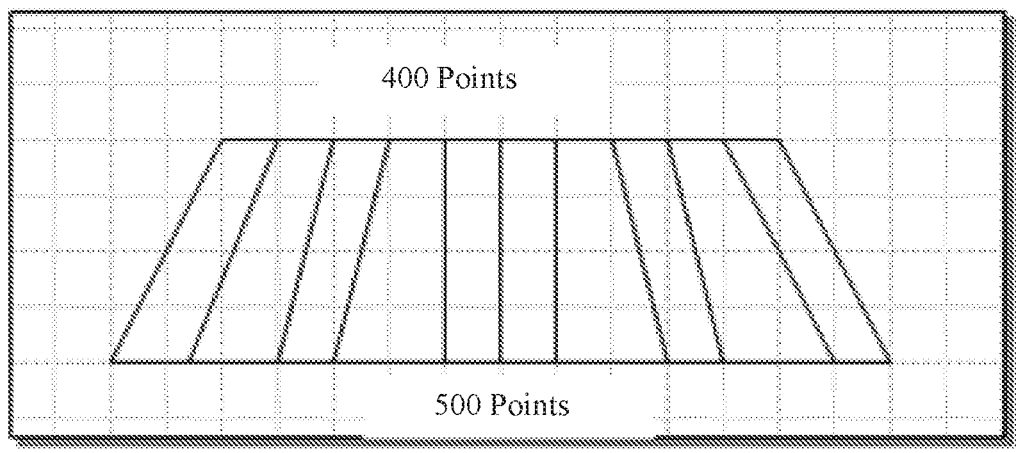
FIG. 3 is a schematic diagram of an exemplary method for screening handwriting data, consistent with some embodiments of this disclosure.

FIG. 3 is a schematic diagram of an exemplary method 300 for screening handwriting data, consistent with some embodiments of this disclosure. Referring to FIG. 3, the handwriting data containing 500 sampling points are screened into handwriting data containing 400 sampling points by using a trapezoid principle. As shown in FIG. 3, the lower base of the trapezoid is 500-point information, and the upper base of the trapezoid is 400-point information. The trapezoid principle is to take out 400 points of information from 500 points of information, and the specific screening rule is to obtain 400 sampling points closest to the sampling interval (500/400) from the lower base. For example, the client terminal may acquire a ratio of the number of the sampling points included in the handwriting data to the first threshold. In this example, the number of the sampling points included in the handwriting data is 500, the first threshold is 400, and the ratio is 500/400. Then by using the first sampling point as the current sampling point and using the ratio as the sampling interval, the client terminal may select the sampling points closest to the current sampling point to perform handwriting resampling until the number of the acquired sampling points is equal to the first threshold. For example, supposing that a horizontal coordinate of a first sampling point is 0, a horizontal coordinate of a second sampling point may be set as (0+500/400), a horizontal coordinate of a third sampling point may be set as (0+2*500/400), and a horizontal coordinate of an Nth sampling point may be set as (0+(N−1)*500/400), where N is equal to 400.

Referring back to FIG. 2, in step S101C, the client terminal acquires attribute information of the handwriting data and processes the attribute information based on a preset length.

In some embodiments, the attribute information of the handwriting data may include horizontal coordinate value X, longitudinal coordinate value Y, time attribute information T, and section attribute information S of handwriting data. For example, the attribute information of the handwriting data may be presented as (X, Y, T, S), where the time attribute information T may include the sampling time of the sampling point, and the section attribute information S may describe a section in which the current sampling point is located, e.g., a stroke in the handwriting data. The attribute information of the handwriting data may also include pressure attribute or other attributes. The handwriting recognition system may preset the length, type and naming rules of each piece of attribute information, so as to reduce the volume of the data included in the attribute information.

In some embodiments, the attribute information of the handwriting data may include time attribute information, and the method 200 may further include the following steps.

In step S104D (not shown), the client terminal may acquire time attribute information corresponding to each sampling point in the handwriting data according to the acquired time attribute information of the handwriting data. The client terminal may then acquire sampling time of each sampling point according to the time attribute information corresponding to each sampling point, and compute a difference value between the sampling time of a first sampling point and the sampling time of each sampling point. The client terminal may use the acquired difference value between the sampling time of each sampling point and the sampling time of the first sampling point as the time attribute information of each sampling point.

In some implementations, the time attribute implemented by the system may be in a long format and the length of a character string included therein is relatively long. In order to reduce data length, in some implementations, the time difference between other sampling points and the first sampling point may be used to represent the time attribute. Thereby, the data length may be effectively reduced. For example, supposing that the handwriting data includes three sampling points and the time attributes of the sampling points may be originally expressed as (14:11:18:09:25:30), (14:11:18:09:25:33) and (14:11:18:09:25:34). After the above-described processing, the time attributes of the sampling points may be expressed as (0s), (3s) and (4s). When the handwriting data includes more sampling points and the volume of the handwriting data is larger, the above-described processing may substantially reduce the data volume of the handwriting data. If the detailed sampling time of the sampling point needs to be obtained, the sampling time of the first sampling point may be recorded in other fields and may not need to be included in a sequence of points. The sampling time of other sampling points may be obtained by the sampling time of the first sampling point and the time difference between the sampling points and the first sampling point.

It is to be understood that steps S101A, S101B, S101C and S104D may be executed in sequence or in parallel, and the execution sequence between the steps may be inverted. In some implementations, the preprocessing operation of the attribute information may be performed after removing ineffective data points and performing screening to the handwriting data so as to reduce the volume of data to be processed.

Referring back to FIG. 1, in step S102, the client terminal transmits the preprocessed handwriting data through the network.

After the original handwriting data is preprocessed, the handwriting data may be compressed and then transmitted through the network for processing by a data receiving device. For example, the data receiving device may be a server.

In some embodiments, the method 100 may further include acquiring handwriting data and performing handwriting recognition. For example, the client terminal may acquire first handwriting data, acquire second handwriting data, and compare the second handwriting data with the first handwriting data to obtain a comparison result. When it is determined that the second handwriting data is matched with the first handwriting data according to the comparison result, the client terminal may determine that handwriting verification passes. Thus, a client terminal may preprocess handwriting data and perform handwriting recognition offline.

Figure 4:
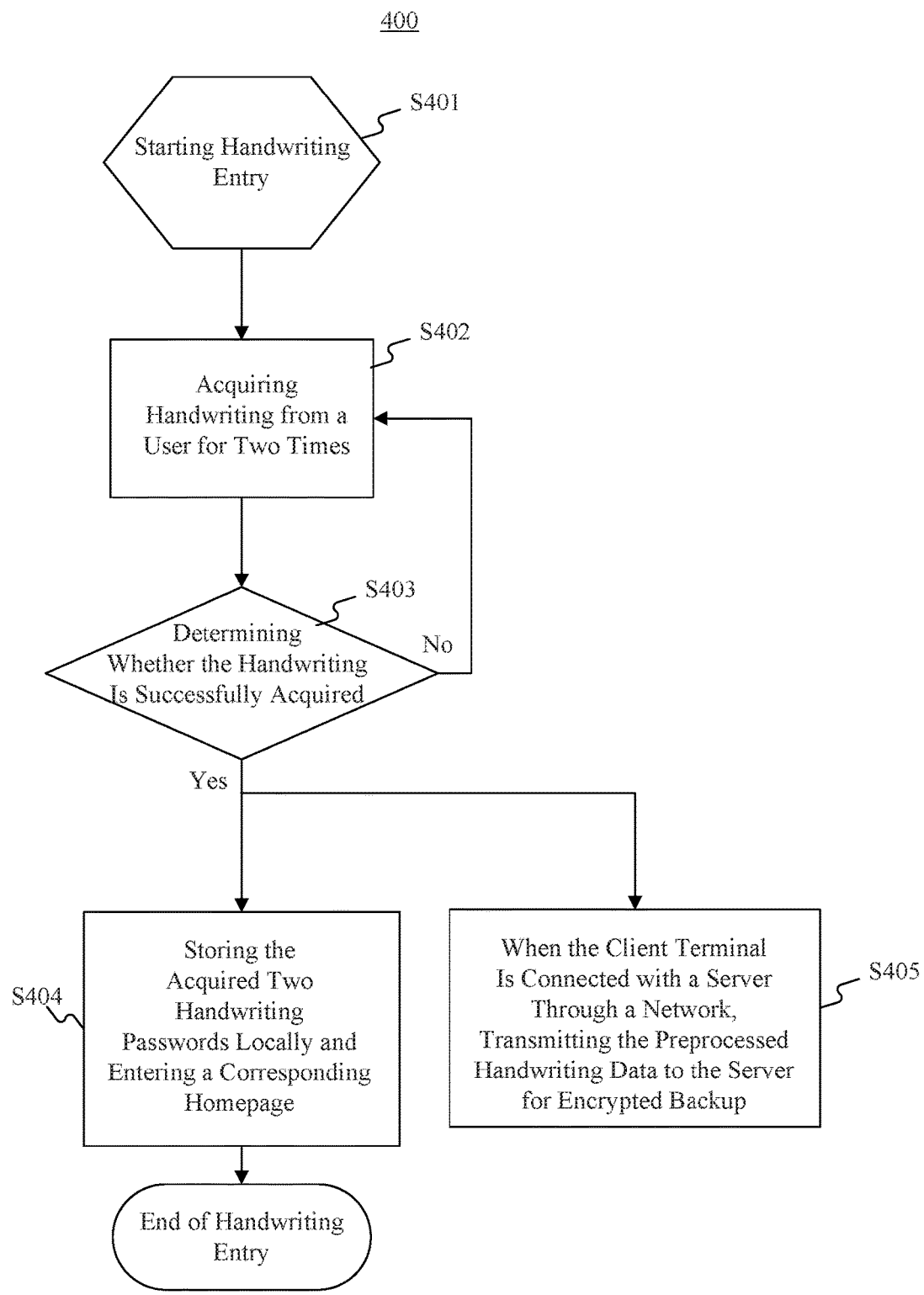
FIG. 4 is a flowchart of an exemplary method for handwriting recognition, consistent with some embodiments of this disclosure.

FIG. 4 is a flowchart of an exemplary method 400 for obtaining handwriting entry of a user, consistent with some embodiments of this disclosure. The exemplary method 400 may be performed by a client terminal. Referring to FIG. 4, the method 400 includes the following steps.

In step S401, the client terminal starts the process for obtaining handwriting entry of a user. In some embodiments, the client terminal may use the initially acquired handwriting data of a user as a login password or a verification password.

In step S402, the client terminal acquires handwriting from a user for two times.

In step S403, the client terminal determines whether the handwriting of the user is successfully acquired. If the handwriting is successfully acquired, the client terminal proceeds to perform step S404. If it is determined that the handwriting is not successfully acquired, the client terminal proceeds to step S402 to re-enter handwriting.

In step S404, the client terminal stores the acquired two handwriting passwords and enters a corresponding homepage.

In step S405, when the client terminal is connected with a server through a network, the client terminal transmits the preprocessed handwriting data to the server for encrypted backup. The step of preprocessing may be performed by referring to the method 100 shown in FIG. 1.

In the method 400, when the client terminal acquires the handwriting data of the user as the login password or verification password, the handwriting data acquired by the client terminal offline may be uploaded to the server for encrypted backup when the client terminal is connected with the network. The server may also use the received handwriting data to improve a handwriting recognition algorithm, such as by establishing a handwriting recognition model through the acquired handwriting data of the user. Where the server needs to perform identity recognition or security authentication, the recognition of the handwriting data may be used as one of security factors of user identity recognition or security authentication.

Figure 5:
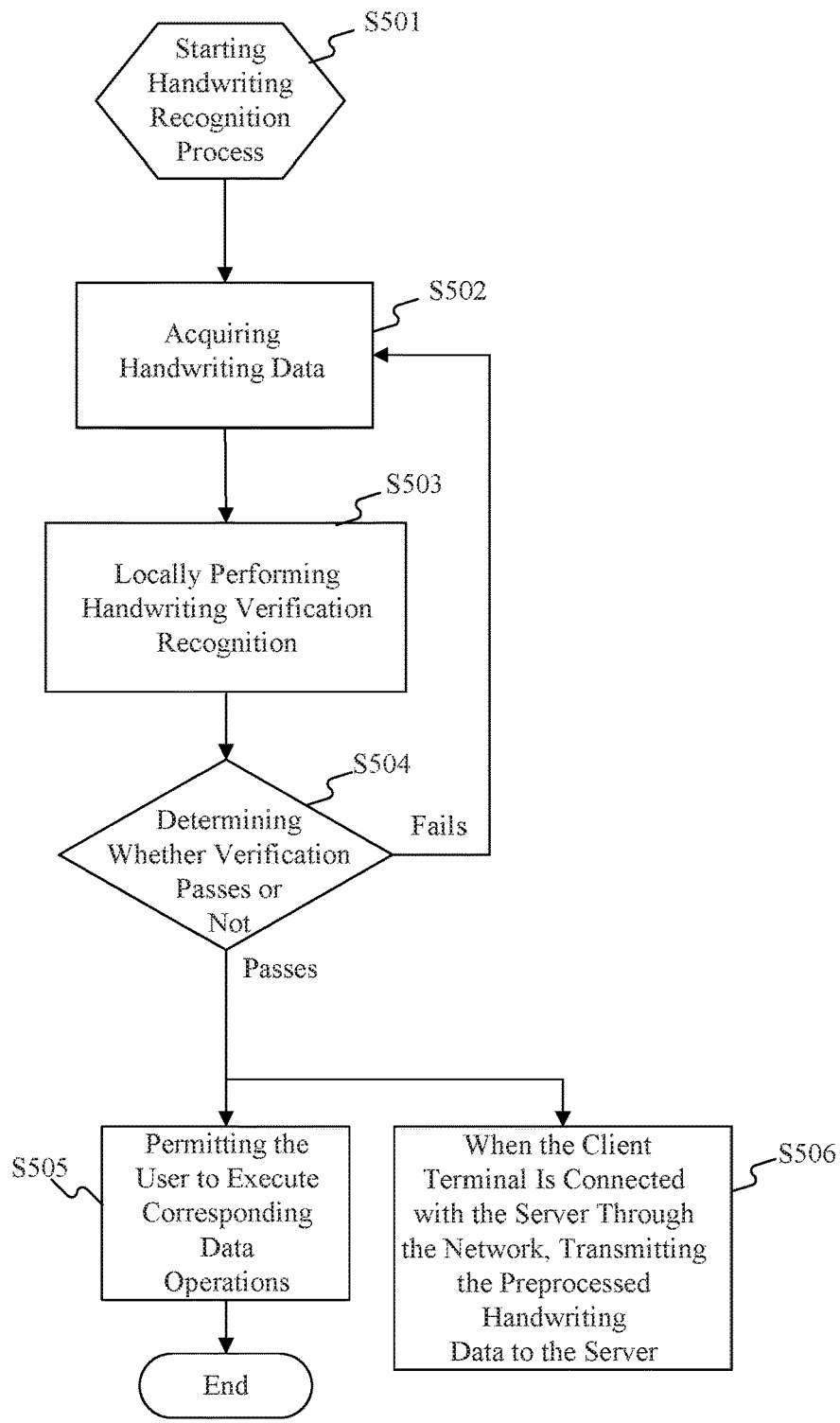
FIG. 5 is a flowchart of another exemplary method for handwriting recognition, consistent with some embodiments of this disclosure.

FIG. 5 is a flowchart of another exemplary method 500 for handwriting recognition, consistent with some embodiments of this disclosure. The exemplary method 500 may be performed by a client terminal. Referring to FIG. 5, the method 500 includes the following steps.

In step S501, the client terminal starts the handwriting recognition process.

In some implementations, when a user needs to log in, the client terminal requires the user to input handwriting to recognize whether the input handwriting is matched with the pre-stored handwriting password or not. If the input handwriting is matched with the pre-stored handwriting password, the user is permitted to log in.

In step S502, the client terminal acquires handwriting data. For example, the user may input the handwriting data according to a prompt of the client terminal.

In step S503, the client terminal locally performs handwriting verification and recognition.

For example, the client terminal may perform comparative recognition to the handwriting data input by the user with the handwriting password pre-stored in the client terminal offline to determine whether the handwriting belongs to the same person.

In step S504, the client terminal determines whether verification passes or not. If the verification passes, the client terminal proceeds to perform step S505. If the verification fails, the client terminal prompts the user to re-enter handwriting or exit.

In step S505, the client terminal permits the user to execute corresponding data operations, such as login and entering relevant pages.

In step S506, when the client terminal is connected with the server through the network, the client terminal transmits the preprocessed handwriting data to the server for encrypted backup. The step of preprocessing the handwriting data acquired in step S506 may be performed by referring to the method 100 shown in FIG. 1.

In the method 500, when the client terminal receives a data request of the user, such as a login request, the handwriting data of the user needs to be acquired and comparative recognition is performed with the pre-stored handwriting data to determine whether the handwriting belongs to the same person or not, so as to allow or decline the data request of the user. The recognition of the handwriting may be executed by the client terminal offline, and the produced operation record data, such as handwriting point sequence, handwriting comparison score, and user equipment information (including the type of equipment, the type of adopted operating system, etc.) may be uploaded to the server when the client terminal is connected with the network. The server may also use the received handwriting data to continuously improve a handwriting algorithm, such as by establishing a handwriting recognition model through the acquired handwriting data of the user. The server may also use the received data to statistically evaluate the accuracy rate of the algorithm or perform processing to the received data, and the recognition of the handwriting data may be used as a security factor of user identity recognition or security authentication.

Figure 6:
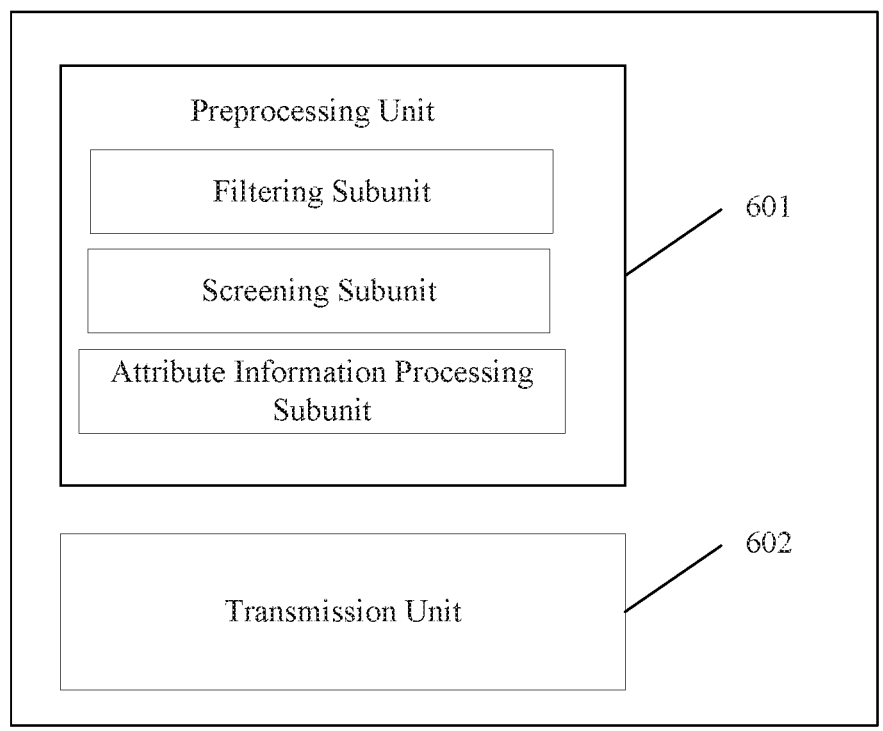
FIG. 6 is a block diagram of an exemplary apparatus for processing handwriting data, consistent with some embodiments of this disclosure.

FIG. 6 is a block diagram of an exemplary apparatus 600 for processing handwriting data, consistent with some embodiments of this disclosure. Referring to FIG. 6, the apparatus 600 includes a preprocessing unit 601 and a transmission unit 602.

The preprocessing unit 601 is configured to preprocess the handwriting data when handwriting data needs to be transmitted through a network.

The transmission unit 602 is configured to transmit the preprocessed handwriting data through the network.

In some embodiments, the preprocessing unit 601 may include a filtering subunit, a screening subunit, and an attribute information processing subunit.

The filtering subunit may be configured to filter the acquired handwriting data so as to remove ineffective data points in the handwriting data.

The screening subunit may be configured to acquire a number of sampling points included in the handwriting data, and when the number of the sampling points exceeds a first threshold, screen the handwriting data such that the number of the sampling points included in the screened handwriting data is not greater than the first threshold.

The attribute information processing subunit may be configured to acquire attribute information of the handwriting data and process the attribute information based on preset length.

In some embodiments, the preprocessing unit 601 may further include a sampling point time attribute acquisition subunit, a sampling time acquisition subunit, a time difference subunit, and an attribute modification subunit.

The sampling point time attribute acquisition subunit may be configured to acquire time attribute information corresponding to each sampling point included in the handwriting data, when the attribute information of the handwriting data includes time attribute information.

The sampling time acquisition subunit may be configured to acquire sampling time of each sampling point according to the time attribute information corresponding to each sampling point.

The time difference subunit may be configured to compute a difference value between the sampling time of the first sampling point and the sampling time of each sampling point.

The attribute modification subunit may be configured to use the acquired difference value between the sampling time of each sampling point and the sampling time of the first sampling point as the time attribute information of each sampling point.

In some embodiments, the filtering subunit may further include a handwriting length acquisition subunit and an ineffective point removing subunit.

The handwriting length acquisition subunit may be configured to acquire handwriting length of each sampling point of the handwriting data.

The ineffective point removing subunit may be configured to, when the handwriting length of the sampling point is greater than a second threshold or smaller than a third threshold, determine the sampling point as an ineffective point and remove the ineffective point from the handwriting data.

In some embodiments, the screening subunit may further include a ratio acquisition subunit and a resampling subunit.

The ratio acquisition subunit may be configured to acquire a ratio of the number of the sampling points included in the handwriting data to the first threshold.

The resampling subunit may be configured to, by taking the first sampling point as a current sampling point and using the ratio as a sampling interval, select sampling points closest to the current sampling point to perform handwriting resampling until the number of the acquired sampling points is equal to the first threshold.

In some embodiments, the apparatus 600 may further include a handwriting data acquisition unit and a handwriting recognition unit. The handwriting data acquisition unit may further include a first acquisition subunit and a second acquisition subunit. The first acquisition subunit may be configured to acquire first handwriting data. The second acquisition subunit may be configured to acquire second handwriting data.

In some embodiments, the handwriting recognition unit may further include a comparison subunit and a verification subunit.

The comparison subunit may be configured to compare the second handwriting data with the first handwriting data to obtain a comparison result.

The verification subunit may be configured to determine that handwriting verification passes, when it is determined that the second handwriting data is matched with the first handwriting data according to the comparison result.

In exemplary embodiments, a non-transitory computer-readable storage medium including instructions is also provided, and the instructions may be executed by a device (such as a client terminal, a personal computer, or the like), for performing the above-described methods. The above-described methods may be implemented in a distributed computing environment, where one or more steps may be executed by a remote processing device connected through a network. The instructions executable by a device for performing the above-described methods may be stored in a local non-transitory computer-readable storage medium or in a computer-readable storage medium located in a remote device.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The illustrated steps in the above-described figures are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments.

One of ordinary skill in the art will understand that the above described embodiments may be implemented by hardware, or software (program codes), or a combination of hardware and software. If implemented by software, it may be stored in the above-described computer-readable media. The software, when executed by the processor may perform the disclosed methods. The computing units and the other functional units described in this disclosure may be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A computer-implemented method for processing handwriting data, comprising:
    filtering the handwriting data to remove one or more ineffective data points, wherein filtering the handwriting data comprises:
        acquiring a handwriting length of each sampling point of the handwriting data; and
        in response to determining that the handwriting length of a sampling point is greater than a second threshold, determining the sampling point as an ineffective data point and removing the ineffective data point from the handwriting data;
    acquiring a number of sampling points included in the handwriting data;
    in response to determining that the number of the sampling points exceeds a first threshold, screening the handwriting data such that the number of the sampling points included in the screened handwriting data is not greater than the first threshold;
        wherein screening the handwriting data comprises:
        acquiring a ratio of the number of the sampling points to the first threshold;
        determining a first sampling point as a current sampling point and determining the ratio as a sampling interval; and
        resampling the handwriting data based on the current sampling point, the sampling interval, and the first threshold, wherein a distance between adjacent sampling points in the resampled handwriting data is equal to the sampling interval, and a number of sampling points in the resampled handwriting data is equal to the first threshold;
    acquiring attribute information of the handwriting data and processing the attribute information based on a preset data length of the attribute information; and
    transmitting the screened handwriting data through a network.

2. The method of claim 1, wherein the attribute information of the handwriting data includes time attribute information corresponding to each sampling point included in the handwriting data.

3. The method of claim 2, further comprising:
    acquiring sampling time of each sampling point according to the time attribute information corresponding to each sampling point;
    computing a difference value between the sampling time of a first sampling point and the sampling time of each sampling point; and
    using the difference value between the sampling time of each sampling point and the sampling time of the first sampling point as the time attribute information of each sampling point.

4. The method of claim 1, wherein filtering the handwriting data further comprises:
    in response to determining that the handwriting length of a sampling point is less than a third threshold, determining the sampling point as an ineffective data point and removing the ineffective data point from the handwriting data.

5. The method of claim 1, further comprising:
    acquiring first handwriting data;
    acquiring second handwriting data;
    comparing the second handwriting data with the first handwriting data to obtain a comparison result; and
    in response to determining that the second handwriting data is matched with the first handwriting data according to the comparison result, determining that handwriting verification passes.

6. The method of claim 5, wherein a client terminal determines offline that handwriting verification passes.

7. The method of claim 6, further comprising transmitting the comparison result to a server when the client terminal is connected with the network.

8. The method of claim 1, wherein the attribute information of the handwriting data includes horizontal coordinate value, longitudinal coordinate value, time attribute information, and section attribute information of the handwriting data.

9. An apparatus for processing handwriting data, comprising:
    a preprocessing unit configured to preprocess the handwriting data, wherein the preprocessing unit comprises a filtering subunit, a screening subunit, and an attribute information processing subunit, wherein:
        the filtering subunit is configured to filter the handwriting data to remove one or more ineffective data points, wherein filtering the handwriting data comprises:

acquiring a handwriting length of each sampling point of the handwriting data; and in response to determining that the handwriting length of a sampling point is greater than a second threshold, determining the sampling point as an ineffective data point and removing the ineffective data point from the handwriting data;

the screening subunit is configured to:

acquire a number of sampling points included in the handwriting data; and in response to determining that the number of the sampling points exceeds a first threshold, screen the handwriting data such that the number of the sampling points included in the screened handwriting data is not greater than the first threshold, wherein screening the handwriting data comprises:

acquiring a ratio of the number of the sampling points to the first threshold;

determining a first sampling point as a current sampling point and determining the ratio as a sampling interval; and resampling the handwriting data based on the current sampling point, the sampling interval, and the first threshold, wherein a distance between adjacent sampling points in the resampled handwriting data is equal to the sampling interval, and a number of sampling points in the resampled handwriting data is equal to the first threshold;

the attribute information processing subunit is configured to:

acquire attribute information of the handwriting data and process the attribute information based on a preset data length of the attribute information; and a transmission unit configured to transmit the preprocessed handwriting data through a network.

10. A non-transitory computer-readable medium that stores a set of instructions that is executable by at least one processor of an apparatus to cause the apparatus to perform a method for processing handwriting data, the method comprising:

filtering the handwriting data to remove one or more ineffective data points, wherein filtering the handwriting data comprises:

acquiring a handwriting length of each sampling point of the handwriting data; and in response to determining that the handwriting length of a sampling point is greater than a second threshold, determining the sampling point as an ineffective data point and removing the ineffective data point from the handwriting data;

acquiring a number of sampling points included in the handwriting data;

in response to determining that the number of the sampling points exceeds a first threshold, screening the handwriting data such that the number of the sampling points included in the screened handwriting data is not greater than the first threshold, wherein screening the handwriting data comprises:

acquiring a ratio of the number of the sampling points to the first threshold;

determining a first sampling point as a current sampling point and determining the ratio as a sampling interval; and resampling the handwriting data based on the current sampling point, the sampling interval, and the first threshold, wherein a distance between adjacent sampling points in the resampled handwriting data is equal to the sampling interval, and a number of sampling points in the resampled handwriting data is equal to the first threshold;

acquiring attribute information of the handwriting data and processing the attribute information based on a preset data length of the attribute information; and transmitting the screened handwriting data through a network.

11. The medium of claim 10, wherein the attribute information of the handwriting data includes time attribute information corresponding to each sampling point included in the handwriting data.

12. The medium of claim 11, wherein the set of instructions that is executable by the at least one processor of the apparatus to cause the apparatus to further perform:

acquiring sampling time of each sampling point according to the time attribute information corresponding to each sampling point;

computing a difference value between the sampling time of a first sampling point and the sampling time of each sampling point; and using the difference value between the sampling time of each sampling point and the sampling time of the first sampling point as the time attribute information of each sampling point.

13. The medium of claim 10, wherein filtering the handwriting data further comprises:

in response to determining that the handwriting length of a sampling point is less than a third threshold, determining the sampling point as an ineffective data point and removing the ineffective data point from the handwriting data.

14. The medium of claim 10, wherein the set of instructions that is executable by the at least one processor of the apparatus to cause the apparatus to further perform:

acquiring first handwriting data;

acquiring second handwriting data;

comparing the second handwriting data with the first handwriting data to obtain a comparison result; and in response to determining that the second handwriting data is matched with the first handwriting data according to the comparison result, determining that handwriting verification passes.

15. The medium of claim 14, wherein a client terminal determines offline that handwriting verification passes.

16. The medium of claim 15, wherein the set of instructions that is executable by the at least one processor of the apparatus to cause the apparatus to further perform:

transmitting the comparison result to a server when the client terminal is connected with the network.

17. The medium of claim 10, wherein the attribute information of the handwriting data includes horizontal coordinate value, longitudinal coordinate value, time attribute information, and section attribute information of the handwriting data.

* * * * *

UNITED STATES PATENT AND TRADEMARK OFFICE
CERTIFICATE OF CORRECTION

PATENT NO. : 10,282,627 B2  
APPLICATION NO. : 15/000123  
DATED : May 7, 2019  
INVENTOR(S) : Yuewei Zeng Page 1 of 1

It is certified that error appears in the above-identified patent and that said Letters Patent is hereby corrected as shown below:

On the Title Page

Item (30), "2015 1 0025759" should read as --201510025759.X--

Signed and Sealed this  
Seventeenth Day of September, 2019

Andrei Iancu  
*Director of the United States Patent and Trademark Office*